Patented Feb. 21, 1950

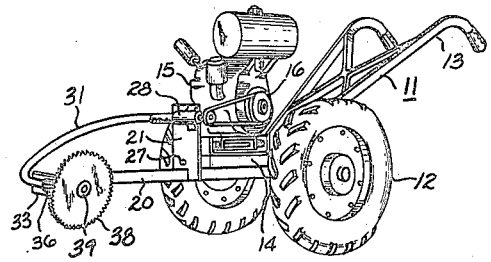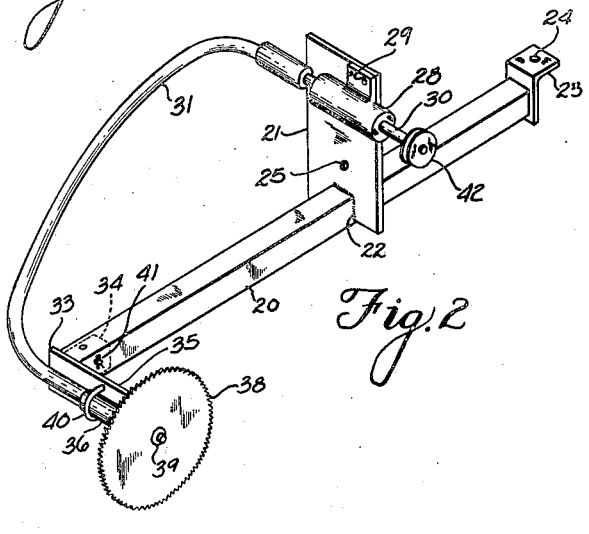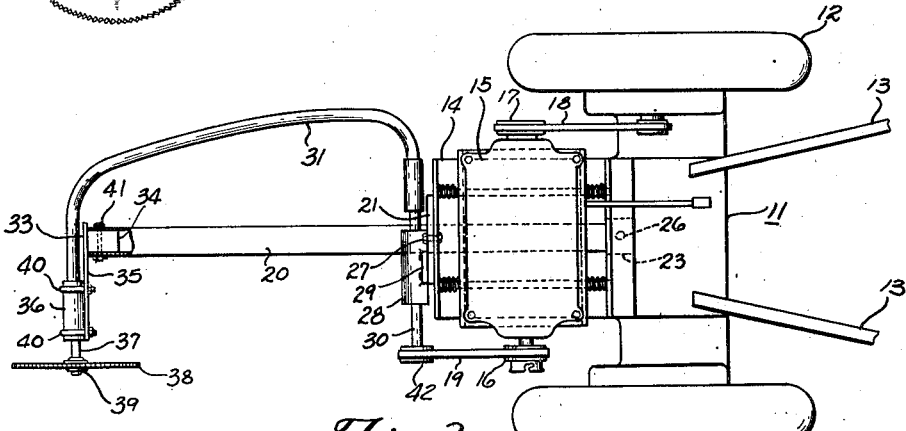

2,498,138

UNITED STATES PATENT OFFICE 2,498,138

ATTACHMENT FOR MOUNTING ROTATABLE TOOLS TO A TRACTOR AND FOR OPERATING THE TOOLS BY THE TRACTOR MOTOR

Robert O. Shepard, Chesterland, and Harold K. Hutchinson, Willoughby, Ohio

Application June 9, 1947, Serial No. 753,582

2 Claims. (Cl. 143—43)

Our invention relates to attachments for the mounting of power driven tools to a tractor, the tool being driven by the tractor motor.

An object of our invention is the provision of an improved attachment for tractors, the attachment bearing a rotatable tool, such as a circular saw, driven by the tractor motor.

Another object is the improvement of a mounting for a rotatable tool driven by a tractor motor and forwardly of the tractor.

Another object is the provision of a mounting for a rotatable tool, such as a saw, which positions the tool in advance of the tractor.

Another object is the provision of a power-driven tool-support readily attachable to a frame of a tractor.

Another object is the provision of mounting means for a rotatable tool, such as a saw, which permits the tool to be disposed in a plurality of planes for different working conditions.

Another object is the provision of a structure accommodating the mounting of a flexible shaft to a tractor whereby the flexible shaft is driven by the tractor motor and the flexible shaft in turn drives a rotatable tool, such as a saw.

Another object is the provision of an adjustably positionable tool mounting whereby the tool is positionable to meet different operating requirements.

Another object is the provision of a tool supporting device which is economical in manufacture, simple to install upon a tractor, and facilitating efficient operation of the tool.

Another object is the provision of an attachment having a beam secured at one end to, and beneath, the frame of a tractor and having its other end extending out forwardly in advance of the tractor, there being a rotatable member carried at the forward end of the beam member and a flexible shaft driven by the tractor motor connected to the tool for rotating the same.

Another object is the provision of a tool attachment which is particularly adaptable for mounting to the frame of a simple two-wheel garden-type tractor.

Another object is the provision of a saw attachment for a tractor which is flexible to permit the saw to readily cut standing trees by positioning the saw in a substantially horizontal plane and which also permits the saw to cut horizontally disposed wood or timber upon positioning the saw in a vertical plane.

Another object is the provision for mounting a rotatable saw in a low position so that it can be disposed near the base of the tree by a bracket carrying the saw mounted in a particular manner to a frame of the tractor.

Another object is the provision of an attachment for a tractor whereby a flexible shaft powered by the tractor motor may be connected to a rotatable tool, such as a circular saw, and the saw rigidly supported by the attachment in its working position.

Other objects and a fuller understanding of my invention may be had by referring to the following description and claims, taken on conjunction with the accompanying drawing, in which:

Figure 1 is a perspective view of a typical two-wheeled garden-type tractor showing our improved tool supporting attachment mounted on the tractor;

Figure 2 is a perspective view of our tool-mounting device removed from the tractor, and shows the tool, that is, the circular saw disposed in a vertical plane as it is also shown in Figure 1;

Figure 3 is a plan view looking down upon the tractor of Figure 1 and shows in plan view our tool mounting device extending out forwardly from the tractor, the saw carried by the device being disposed in the vertical plane as in Figures 1 and 2; and Figure 4 is a detailed view of the forward end of our device and shows the tool holding member at the forward end disposed at right angles to its position shown in Figures 1, 2, and 3, so as to position the saw or other rotatable tool in a substantially horizontal plane.

In the drawing, the reference character 11 denotes generally the two-wheeled tractor shown. This tractor is of a well-known type having two wheels 12, guide handles 13, a steel frame or bed 14, and a gasoline motor 15. The handles 13 are attached to the frame 14 and are used for guiding the movements of the tractor. The frame 14 with the wheels 12 forms the chassis of the tractor. The frame 14 made of structural steel members has on it a bed for supporting the motor 15. In this particular type of tractor the motor is shiftable on the frame 14 to be moved forwardly and backwardly with an appropriate lever arrangement. The guide rods and springs shown provide for the easy movement of the motor to a forward or a backward position on the frame 14 upon operation of a lever.

In the description and claims, the forward end of the tractor and of the frame are considered as the left-hand end of the tractor as shown in Figures 1 and 3, that is the end toward which the tractor moves as a man follows it behind the handles 13. The rearward direction is considered that direction toward the right-hand side of the views shown in Figures 1 and 3 and the rearward end of the tractor would be the portion closest to the operator at the handles 13.

On the right-hand side of the motor there is a tractor driving pulley 17 driven by the motor and this pulley 17 drives the tractor wheels in a forward direction through the pulleys 18 and suitable driving connection upon movement of the motor 15 on the frame 14 to a degree sufficient to make the belt 18 taut. Upon the belt 18 being tightly engaged by the pulley 17 the tractor wheels are driven.

Upon the left-hand side of the motor 15, there extends a pulley 16 also driven by the motor 15. The pulley 16 is provided on its outer portion with a rim suitable for receiving a starting rope used for cranking the motor on its initial start. Both pulleys 16 and 17 are mounted upon and rotated by the motor shaft.

The power tool carrying attachment shown separately in Figure 2 is comprised generally of a beam member 20, an upright support member 21, a tool carrying member 33, the flexible shaft 31, and the connections and appurtenances associated therewith. The beam member 20 is a longitudinal hollow steel bar having an internal and external square cross section. The upright support member 21 is mounted to the beam member 20 intermediate of its ends and extends upwardly therefrom at right angles from the beam member. The upright member 21 is a steel plate having a niche in its lower edge to accommodate the beam member 20. The welding 22 around the engaging surfaces of the upright member 21 and beam member 20 firmly secures the upright member 21 in rigid position.

An angle piece 23 is welded to the rearward end of the beam member 20 and has the horizontal portion of the angle piece 23 disposed parallel to the beam member 20. A hole 24 in the upper portion of the angle piece 23 is adapted to receive a threaded bolt disposed vertically therethrough and connected to the frame 14. The bolt 26, shown in Figure 3, extends vertically and securely fastens the angle piece 23 to the bottom of the frame 14.

A hole 25 in the upright member 21 receives a bolt 27 which extends in a horizontal position and is fastened to the front end of the frame 14. Thus, the bolt 26 and the bolt 27 are disposed at right angles to each other and by the arrangement shown the tool attaching device is rigidly secured to the frame with little or no play and with a minimum of stress. The rearward portion of the beam member, that is, the portion rearwardly of the upright member 21 is thus anchored to the frame 14 and positioned slightly below it. This permits the beam member and the tool carried thereby to be positioned low to the ground and in a proper location for efficient operation of the tool.

A bearing member 28 having a flange 29 is bolted to the upper portion of the upright member 21 as shown. The bearing member 28 is disposed by substantially horizontal plane, that is, with the axis of the bearing member 28 disposed substantially horizontal. Also, the axis of the bearing member 28 is disposed transversely of the beam member 20 and hence transversely of the longitudinal dimension of the tractor. A mandrel or shaft 30 is mounted in the bearing member 28 so as to freely rotate therein. A pulley 42 is mounted upon the end of the mandrel 30 so that the pulley 42 and mandrel 30 rotate together.

A conventional flexible shaft construction, composed of the flexible casing 31 and the flexible shaft 32 positioned therein, are secured to the bearing member 28 and mandrel 30. The flexible shaft 32 is keyed or otherwise anchored to the mandrel 30 so as to rotate with the rotation of the mandrel 30. The flexible shaft casing 31 has its corresponding end secured to the bearing member 28. The connection of the flexible shaft and its casing to the mandrel and the bearing member is by the usual arrangement. The end of the flexible shaft assembly which is secured to the bearing member 28 and mandrel 30 is referred to as the rearward end of the flexible shaft assembly, that is, the end closest to the rear of the tractor.

At the forward end of the beam 20 there is positioned a tool carrying member 33. The tool carrying member 33 is composed of an insert portion 34 and an arm portion 35. The arm portion 35 is a plate of steel welded to the insert portion 34 at right angles to the axis of the insert portion 34. The insert portion 34 has a square cross section slightly smaller than the inside hollow dimension of the beam member 20. As the forward end of the beam member 20 is open and hollow the inside of the beam member 20 at its forward end forms a noncircular socket having its axis disposed longitudinally of the beam member 20. As the insert portion 34 complementarily fits within the socket formed at the open end of the beam member 20 and as both the insert portion 34 and the socket have a square cross section it is apparent that the insert portion 34 may be inserted in any one of four positions, each position being 90°, 180° or 270° out-of-phase with a first position. By this arrangement the arm portion 35 is always maintained at right angles to the beam member 20 and at the same time the arm portion 35 may be rotated into any one of four positions by withdrawal of the insert portion 34 and its re-insertion into the desired position in the socket formed in the end of the beam member 20. Thus, the tool carrying member can adjustably be directed downwardly from the end of the beam member 20, leftwardly from the end of the beam member 20, rightwardly from the end of the beam member, and upwardly from the end of the beam member. This provides for flexible adjustment of the tool carrying member 33 to meet the working requirements encountered.

To prevent the insert portion 34 from slipping out of the socket formed in the forward end of the beam member 20 after it is positioned as desired there is formed in the end of the beam member and in the insert portion holes extending therethrough, one set of holes being at right angles to another set of holes. A pin bolt 41 extending through registering holes in the beam member and insert portion retain the insert portion within the socket. When the tool carrying member 33 is disposed in one direction the pin bolt 41 may be disposed vertically through registering holes and when the tool carrying member 33 is shifted to another position the pin bolt may be disposed horizontally through other registering holes. A cotter pin on the end of the pin bolt may be used for securing it in the holes. By the arrangement shown, the tool carrying member 33 may be quickly and readily shifted from one position to another and then locked in space so as to provide for its rigid connection with the beam member 20.

A bearing member 36 is secured to the arm portion 35 of the tool carrying member 33 by means of the U-bolts 40 secured by nuts to the arm portion 35. The bearing member 36 has its axis disposed parallel to the arm 35 and the bearing member 36 is directed in the same direction as the arm portion 35 and thus the bearing member 36 is shifted to the desired position with the tool carrying member 33. A mandrel or shaft 37 is mounted in the bearing 36 so as to freely rotate therein. The forward end of the flexible shaft assembly is secured in the usual manner to the bearing member 36 and mandrel 37. The rotating flexible shaft 32 is keyed or otherwise secured to the mandrel 37 so that both rotate together and the flexible shaft casing 31 is secured or anchored to the bearing member in the usual manner.

The outer end of the mandrel 37 is adapted to carry a rotatable tool therein and in the illustration of my drawing, a circular saw 38 is secured to the end of the mandrel 37 by a nut 39 in such manner that the saw 38 revolves as the mandrel 37 rotates.

It is seen from the drawing and description that, upon a shifting of the motor 15 on the frame 14 to a position which tightens or makes taut the belt 19 between the pulleys 16 and 42, the saw 38 is rotated by the motor power delivered through pulley 16, belt 19, pulley 42, mandrel 30 flexible shaft 32, and mandrel 37 to the saw 38. By reason of the flexible arrangement shown, the saw 38 is power driven while positioned in any pre-selected one of four possible positions. Only two possible positions are shown in the drawing but it is obvious that the arrangement provides for four possible positions. Also by changing the shape of the socket and the insert portion 34 in which it fits, other and varied positions may be provided for.

With the use of the tractor shown the motor 15 powers the tractor for its movement over the ground when the position of the motor is shifted to tighten the belt 18 which correspondingly loosens and disengages the belt 19. After the tractor is in the desired location then the motor 15 is shifted on the frame 14 so as to loosen the belt 18 to disengage it from driving the tractor and to tighten the belt 19 to cause power to be delivered to the saw. It is thus seen that the shifting of the motor 15 forwardly and backwardly on the frame 14 provides a clutching arrangement whereby power is delivered from the motor to either the tractor wheels or to the circular saw 38.

Our attachment provides many advantages and benefits in the use of a tractor of this type and provides means for using a power driven saw in a manner not heretofore obtainable. In the cutting down of undesired trees, and particularly those that are difficult to approach and work on, such as thorn apple trees, sumac, poison oak and scrubby brush, our saw carrying attachment for a tractor provides an efficient and quick way of eradicating such trees and brush. The saw is disposed in a horizontal position with the tool carrying member 33 directed downwardly as in Figure 4. After the tractor is driven up to the tree the saw is driven to rotate and by directing the handles 13 of the tractor the saw 38 is directed into the base of the tree or brush at the level of the ground. The low disposition of the beam member 20 and its attachment under the frame of the tractor provides for getting the saw or other rotatable tool in low position and in locations having otherwise inconvenient access. It is found that our attachment provides for the quick cutting down of obnoxious trees, such as thorn apple trees, with a minimum of time, effort and risk. After cutting off the trees at substantially ground level the roots will die out except for an occasional sucker or green shoot which may be readily cut with a mowing machine or scythe. Within a year the roots are dead and the ground may be plowed.

By turning the tool-carrying member upwardly the saw 38 may be positioned to cut at a higher level. Also by tilting the beam member 20 by moving the handle 13 of the tractor up or down a cut at an acute angle to the horizontal may be made in the trunk of a standing tree and thus the tree may be notched as desired.

For cutting cord wood, logs or lumber disposed in a horizontal position the saw 38 may be disposed vertically as shown in Figures 1, 2 and 3. The saw 38 may be on the right side or the left side of the beam member 20 as desired. The flexible shaft is of sufficient length to permit directing of the tool carrying member and saw in any of the variable positions obtainable.

While the greatest utility of the tractor attachment is for a circular saw it can also be used for carrying and driving other rotatable tools such as a grinding wheel, a circular brush or a buffing wheel.

Our attachment has solved a practical and real problem in the carrying and powering of rotating tools, our solution being efficient and economical and providing for results not heretofore obtainable.

Although we have described our invention in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed:

1. An auxiliary device for a tractor having a frame carrying a motor thereon, said motor having a driving pulley, said pulley having its axis disposed substantially horizontally and transversely of said tractor, and said motor being movable along said frame longitudinally of said tractor to shift the axis of said driving pulley forward and backward on said tractor, said device comprising a beam member adapted to be carried by, and beneath, said frame and project forwardly of said tractor, the forward end of said beam member having a non-circular socket formed therein, the axis of said socket being parallel to the axis of said beam member, an upright member secured to said beam member intermediate its ends and extending upwardly from said beam member, first fastening means for securing the rear end of said beam member to, and beneath, said frame, second fastening means for securing said upright member to the forward end of said frame, a first bearing member carried by said upright member, a first mandrel rotatably carried by said first bearing member, a driven pulley non-rotatively carried by said first mandrel, the axes of said first mandrel and driven pulley being disposed substantially horizontally and transversely of said beam member to parallel the axis of said driving pulley, said driven pulley being adapted to be operatively connected to said driving pulley upon movement of said motor on said tractor to shift the axis of said driving pulley backward relative to said driven pulley, a tool-carrying member carried by the forward end of said beam member, said tool-carrying member having an insert portion positioned in, and non-rotatively engaged in, said socket, and having an arm portion extending at substantially right angles to said insert portion, said insert portion being engageable in said socket in a plurality of selected positions to selectively vary the direction of said arm portion extending from said beam member, a second bearing member carried by said arm portion, a second mandrel rotatively carried by said second bearing member and adapted to carry and operate a rotatable tool, a flexible shaft operatively connecting said first and second mandrels, and a flexible casing on said flexible shaft and connecting said first and second bearing members, the operation of said driven pulley by said driving pulley rotating said rotatable tool through said mandrels and flexible shaft.

2. An attachment for a tractor having a motor and a frame adapted to carry a rotatable tool forwardly of said tractor, the rotatable tool being operated by the tractor motor, said attachment comprising a beam member, said beam member having a socket in its forward end having its axis disposed longitudinally of said beam member, an upright member secured to said beam member intermediate its ends and extending upwardly from said beam member, first securing means disposed in one plane for securing said beam member rearwardly of said upright member to, and beneath, said frame, second securing means disposed in a plane at substantially right angles to the plane of said first securing means for securing said upright member to the forward end of said frame, a first bearing member carried by said upright member, a first mandrel rotatably mounted in said first bearing member, drive means for rotatably driving said first mandrel by said tractor motor, a tool-carrying member carried by the forward end of said beam member, said tool-carrying member having an insert portion insertable in said socket in a selected one of a plurality of positions and having an arm portion disposed at right angles to said insert portion, means for preventing rotation of said insert portion in said socket, said arm portion being adapted to be disposed at right angles to said beam member and to extend in a selected one of a plurality of directions from the said beam member upon insertion of said insert portion into a selected one of said plurality of positions in said socket, a second bearing member carried by said arm portion, a second mandrel rotatably mounted in said second bearing member, said second mandrel being adapted to carry a rotatable tool thereon, and a flexible shaft operatively connecting said first and second mandrels, the arrangement of said beam member, tool-carrying member, and mandrels being such that a rotatable tool on said second mandrel may be driven by said tractor motor and may be adjusted to selected positions by the selective mounting of said tool-carrying member in said socket.

ROBERT O. SHEPARD.
HAROLD K. HUTCHINSON.

REFERENCES CITED

The following references are of record in the file of this patent:

UNITED STATES PATENTS

| Number | Name | Date |
|---|---|---|
| 2,097,729 | Mall | Nov. 2, 1937 |
| 2,312,972 | Orr | Mar. 2, 1943 |
| 2,412,705 | Jaques | Dec. 17, 1946 |
| 2,426,694 | King | Sept. 2, 1947 |
| 2,435,192 | Arsneau | Feb. 3, 1948 |

FOREIGN PATENTS

| Number | Country | Date |
|---|---|---|
| 113,879 | Australia | Sept. 16, 1941 |
| 117,455 | Australia | Aug. 31, 1943 |